US011176599B2

(12) United States Patent
Landra et al.

(10) Patent No.: US 11,176,599 B2
(45) Date of Patent: Nov. 16, 2021

(54) SYSTEM AND METHOD OF AUXILIARY DATA ACCESS

(71) Applicant: AMADEUS S.A.S., Biot (FR)

(72) Inventors: Corinne Francoise Pascale Landra, Opio (FR); Michael Dominique Raymond Galopo, Mougins (FR)

(73) Assignee: AMADEUS S.A.S., Biot (FR)

( * ) Notice: Subject to any disclaimer, the term of this patent is extended or adjusted under 35 U.S.C. 154(b) by 20 days.

(21) Appl. No.: 16/699,220

(22) Filed: Nov. 29, 2019

(65) Prior Publication Data
US 2021/0166294 A1    Jun. 3, 2021

(51) Int. Cl.
*G06Q 30/00* (2012.01)
*G06Q 30/06* (2012.01)
*G06F 16/23* (2019.01)
*G06Q 30/02* (2012.01)

(52) U.S. Cl.
CPC ..... *G06Q 30/0635* (2013.01); *G06F 16/2358* (2019.01); *G06Q 30/0222* (2013.01); *G06Q 30/0611* (2013.01)

(58) Field of Classification Search
CPC .................................................. G06Q 30/00
USPC ..................................................... 705/26.81
See application file for complete search history.

(56) References Cited

U.S. PATENT DOCUMENTS

| | | | | |
|---|---|---|---|---|
| 6,085,169 A * | 7/2000 | Walker | ............... | G06Q 10/02 705/4 |
| 7,958,224 B2 * | 6/2011 | Amjadi | ............... | G06Q 30/0239 709/224 |
| 10,248,913 B1 * | 4/2019 | Gururajan | ............... | G06Q 50/30 |
| 10,699,353 B2 * | 6/2020 | Charrat | ............... | G06Q 50/14 |
| 2001/0034626 A1 * | 10/2001 | Gillespie | ............... | G06Q 10/02 705/6 |
| 2002/0156659 A1 * | 10/2002 | Walker | ............... | G06Q 20/00 705/5 |
| 2003/0018499 A1 * | 1/2003 | Miller | ............... | G06Q 30/08 705/5 |

(Continued)

OTHER PUBLICATIONS

Boitnott, John, "Personalized Discounts: How Targeting a Customer's intersts can help increase sales" American Express, dated Mar. 7, 2018. (Year: 2018).*

(Continued)

*Primary Examiner* — Mark A Fadok
(74) *Attorney, Agent, or Firm* — Perry + Currier

(57) ABSTRACT

A method of providing access to auxiliary data for a provider subsystem includes: storing offer data corresponding to an item, the offer data including (i) primary data, and (ii) auxiliary data defining an adjustment between the primary data and corresponding published data stored at an external repository; storing the offer data in an auxiliary repository; in response to an order request from a client subsystem: obtaining an order identifier corresponding to the offer data; and updating the auxiliary repository to store the order identifier in association with the offer data; in response to obtaining the order identifier, generating a reporting message for transmission to a provider subsystem, the reporting message containing the primary data and omitting the auxiliary data; and subsequent to generating the reporting message, retrieving the offer data from the auxiliary repository, and sending at least the auxiliary data to the provider subsystem.

19 Claims, 7 Drawing Sheets

(56) References Cited

U.S. PATENT DOCUMENTS

| | | | | |
|---|---|---|---|---|
| 2003/0229523 | A1* | 12/2003 | Goldstein | G06Q 30/06 705/5 |
| 2005/0091087 | A1* | 4/2005 | Smith | G06Q 30/0645 705/5 |
| 2007/0061174 | A1* | 3/2007 | Phillips | G06Q 30/02 705/5 |
| 2010/0010841 | A1* | 1/2010 | Cooper | G06Q 10/02 705/6 |
| 2015/0347476 | A1* | 12/2015 | Fontebride | G06F 16/955 707/741 |
| 2018/0204237 | A1* | 7/2018 | Jafri | G06Q 10/02 |
| 2018/0204294 | A1* | 7/2018 | Anzalota | G06Q 30/0255 |
| 2019/0281531 | A1* | 9/2019 | Scarborough | G06Q 10/02 |

OTHER PUBLICATIONS

Pan, Alberto, et al. "Mediator systems in E-commerce applications." Proceedings Fourth IEEE International Workshop on Advanced Issues of E-Commerce and Web-Based Information Systems (WECWIS 2002). IEEE, 2002. pp. 228-235.

Haas, Laura M., Eileen Tien Lin, and Mary A. Roth. "Data integration through database federation." IBM Systems Journal 41.4 (2002): 578-596.

* cited by examiner

SYSTEM AND METHOD OF AUXILIARY DATA ACCESS

FIELD

The specification relates generally to communication systems, and specifically to a system and method of enabling access to auxiliary data.

BACKGROUND

The performance of various tasks, such as the provision of items (e.g. travel-related products and services) from providers to consumers, may involve interaction between a number of distinct computing subsystems operated by different entities. Alternations to mechanisms by which some of the above-mentioned subsystems operate can negatively impact the operations of other subsystems, which may necessitate costly modifications to the other subsystems.

SUMMARY

An aspect of the specification provides a method of providing access to auxiliary data for a provider subsystem, comprising: storing offer data corresponding to an item, the offer data including (i) primary data, and (ii) auxiliary data defining an adjustment between the primary data and corresponding published data stored at an external repository; storing the offer data in an auxiliary repository; in response to an order request from a client subsystem: obtaining an order identifier corresponding to the offer data; and updating the auxiliary repository to store the order identifier in association with the offer data; in response to obtaining the order identifier, generating a reporting message for transmission to a provider subsystem, the reporting message containing the primary data and omitting the auxiliary data; and subsequent to generating the reporting message, retrieving the offer data from the auxiliary repository, and sending at least the auxiliary data to the provider subsystem.

Another aspect of the specification provides an intermediation server, comprising: a communications interface; a memory storing an auxiliary repository containing offer data corresponding to an item, the offer data including (i) primary data, and (ii) auxiliary data defining an adjustment between the primary data and corresponding published data stored at an external repository; and a processor connected with the communications interface and the memory, the processor configured to: in response to an order request from a client subsystem: obtain an order identifier corresponding to the offer data; and update the auxiliary repository to store the order identifier in association with the offer data; in response to obtaining the order identifier, generate a reporting message for transmission to a provider subsystem, the reporting message containing the primary data and omitting the auxiliary data; and subsequent to generating the reporting message, retrieve the offer data from the auxiliary repository, and send at least the auxiliary data to the provider subsystem.

A further aspect of the specification provides a non-transitory computer-readable medium storing computer-readable instructions executable by a processor of an intermediation server to: store, in a memory of the intermediation server, an auxiliary repository containing offer data corresponding to an item, the offer data including (i) primary data, and (ii) auxiliary data defining an adjustment between the primary data and corresponding published data stored at an external repository; in response to an order request from a client subsystem: obtain an order identifier corresponding to the offer data; and update the auxiliary repository to store the order identifier in association with the offer data; in response to obtaining the order identifier, generate a reporting message for transmission to a provider subsystem, the reporting message containing the primary data and omitting the auxiliary data; and subsequent to generating the reporting message, retrieve the offer data from the auxiliary repository, and send at least the auxiliary data to the provider subsystem.

BRIEF DESCRIPTIONS OF THE DRAWINGS

Embodiments are described with reference to the following figures, in which.

DETAILED DESCRIPTION

Figure 1:
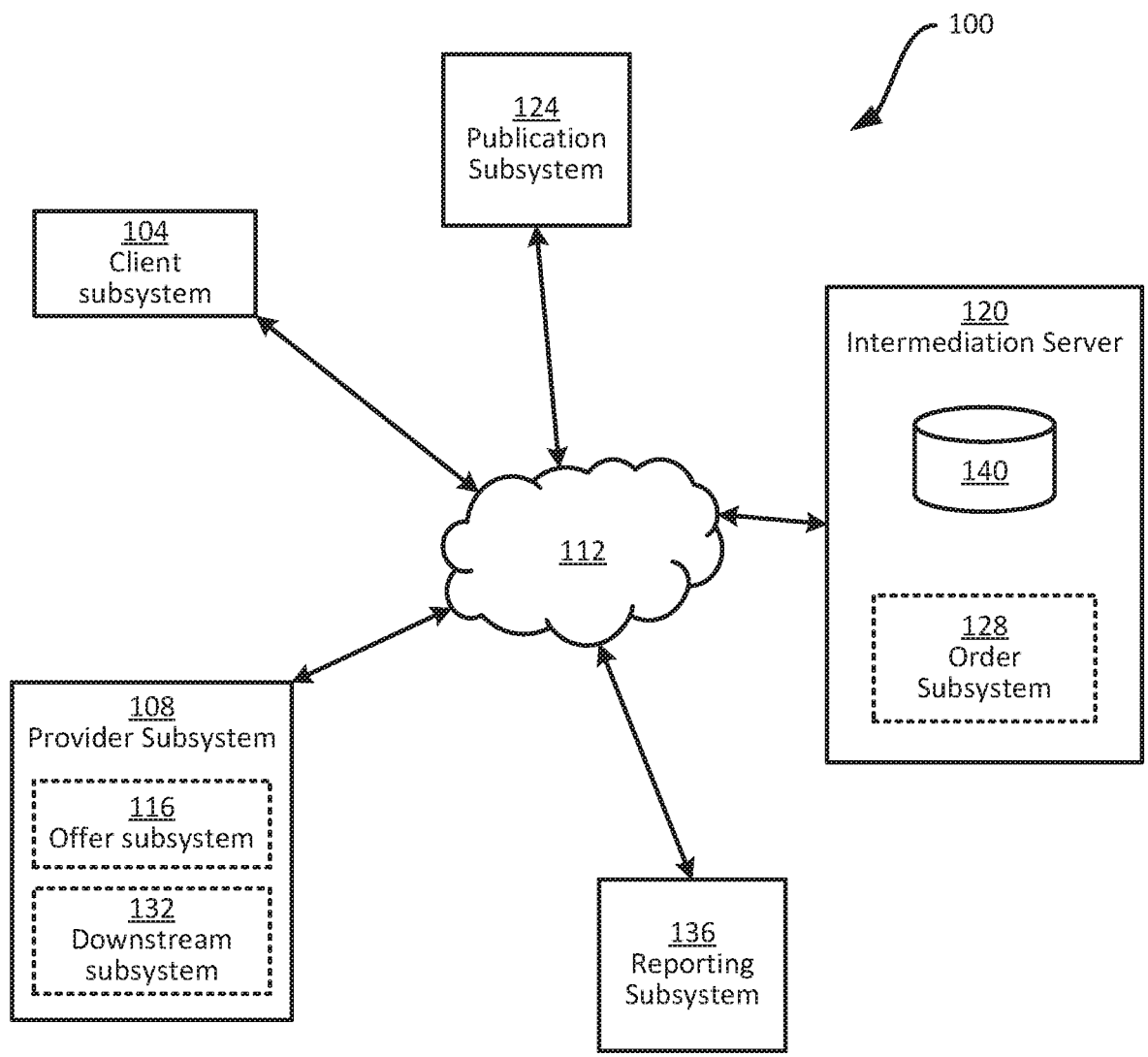
FIG. 1 is a diagram illustrating a system for providing auxiliary data access.

FIG. 1 depicts a system 100 for providing auxiliary data access. Within the system 100, various computing subsystems interact to generate and process data relating to any of a wide variety of activities. In the examples discussed below, the subsystems of the system 100 interact to generate and process data relating to the delivery of items to customers. The items, in the examples, below, are travel-related products and services, such as flight tickets, hotel reservations, vehicle rental reservations, and the like. A wide variety of other activities can be enabled by the exchange of data between the subsystems shown of the system 100, and the specific nature of the data processed within the system 100 is not particularly limited.

In the illustrated example, the system 100 includes a client subsystem 104, operated by a client entity that may also be referred to as a seller. The seller can be, for example, a travel agency. The client subsystem 104 generates requests, e.g. on behalf of customers, for travel items. The requests specify various attributes of the travel items, such as origin and destination locations, times and dates of travel, and the like. Responses to requests from the client subsystem 104 are generated by, or on behalf of, entities that provide the items, referred to herein as providers. Therefore, in the present example the providers are entities such as airlines, hotel operators or the like that deliver the items to the customer following purchase of the items (e.g. via the client subsystem 104).

In the illustrated example, the providers also generate the above-mentioned responses to requests from the client subsystem 104. To that end, each provider entity operates a provider subsystem 108. Each of the client subsystem 104 and the provider subsystem 108 are implemented as at least one computing device with input and output assemblies and communications devices for exchanging data via a network 112. The network 112 can include any suitable combination of local-area and wide-area networks, including the Internet. Although a single client subsystem 104 and a single provider subsystem 108 are shown in FIG. 1, the system 100 can include a greater or smaller number of client subsystems 104 and provider subsystems 108 in other examples.

The provider subsystem 108 can include an offer subsystem 116 that generates data for responding to requests from the client subsystem 104. In response to any given request received at a provider subsystem 108, the offer subsystem 116 can generate response data for returning to the client subsystem 104, defining one or more items or sets of items that are selectable for purchase at the client subsystem 104. In general, generation of response data by an offer subsystem 108 involves selecting, among the set of items (e.g. flights) provided by the entity operating the provider subsystem 108, one or more items having characteristics that match at least some of the options and attributes in the request.

Although the offer subsystem 116 generates responses to requests from the client subsystem 104, the requests need not be transmitted directly from the client subsystem 104 to the provider subsystem 108. Instead, in the illustrated example, the system 100 also includes an intermediation server 120 that receives requests from the client subsystem 104, and passes such requests to the provider subsystem 108. The intermediation server 120 also receives responses from the provider subsystem 108 and returns such responses to the client subsystem 104.

In systems that include multiple provider subsystems 108, the intermediation server 120 can therefore pass a given request from the client subsystem 104 to multiple provider subsystems 108, receive responses from each of those provider subsystems 108, and combine the responses for return to the client subsystem 104. In addition, in some examples the intermediation server 120 can implement the offer subsystem 116 on behalf of the provider subsystem 108, and the provider subsystem 108 itself therefore may not be directly involved in the generation of responses to requests from the client subsystem 104, instead providing configuration data periodically to the intermediation server 120 to enable the intermediation server 120 to implement the offer subsystem 116.

As will be apparent to those skilled in the art, offer generation by or on behalf of the provider subsystem 108 as described above can be implemented according to the New Distribution Capability (NDC) standard in the system 100. The system 100 can also implement other offer distribution mechanisms, such as the legacy Global Distribution System (GDS) method, alongside the mechanism discussed above. For example, the provider subsystem 108 may publish, to an external repository maintained by a publication subsystem 124, data such as fares (i.e. prices), scheduling information and the like. The publication subsystem 124 can be consulted by, for example, the intermediation server 120 to generate offers in response to requests from the client subsystem 104.

Following the return of response data to the client subsystem 104 via the intermediation server 120, the client subsystem 104 can select one or more items for purchase. Such a selection may also be referred to as an order request (i.e. ordering an item that was offered by the provider subsystem 108). The order request is received at the intermediation server 120 and processed by an order management subsystem, also referred to simply as an order subsystem 128. Handling of the order request can include transmitting data to the provider subsystem 108 to initiate processes for the actual provision (i.e. delivery and fulfillment) of the relevant items to the customer by the provider. Those processes can include requesting payment information, storing customer identification information and updating a passenger listing for a flight, for example. Order processing may lead to the generation of an order identifier, such as an electronic ticket number, which may be returned to the client subsystem 104 via the intermediation server 120.

In addition, order processing can include the transmission of order data from the order subsystem 128 to the provider subsystem 108. More specifically, the provider subsystem 108 can include a downstream subsystem 132, such as a revenue and accounting module. Such transmission can be performed directly from the order subsystem 128 to the downstream subsystem 132, or from the order subsystem 128 to a reporting subsystem 136, which is configured to pass the order data to the downstream subsystem 132. An example of the reporting subsystem 136 is a billing and settlement plan (BSP) processor.

The downstream subsystem 132, which in other examples can be implemented as a separate subsystem in the system 100 (i.e. as a logically and physically separate computing device or set of computing devices from the provider subsystem 108), consumes the above-mentioned order data and performs various actions using the order data. Examples of such actions include pro-rating revenue between the provider and the seller, between the provider and other providers (e.g. for interline flights) and the like. The downstream subsystem 132 is also configured to retrieve data from the external repository of the publication subsystem 124 mentioned above to perform the above actions.

In systems operating according to legacy standards (e.g. GDS method noted earlier), there is little deviation between data stored by the publication system 124 and offer and order data. In systems operating according to other standards, such as the NDC standard, however, the generation of offer data at the offer subsystem 116, and in some cases also the generation of order data at the order subsystem 128, can include dynamic adjustments. Such adjustments can include adjustments to item prices, offer composition (e.g. to include additional items), and the like. Those adjustments may not be reflected in the publication subsystem 124. Therefore, the downstream subsystem 132 may receive order data that conflicts with data retrieved from the publication subsystem 124. For example, the order data may define a price that is discounted relative to the price for the same item retrieved from the publication subsystem 124. The downstream subsystem 132 may therefore detect a conflict and require human intervention, or may generate erroneous output.

The system 100 implements additional functionality to enable the provision of auxiliary data defining the above adjustments to the downstream subsystem 132, while minimizing the need to alter existing processes of the downstream system 132 and the reporting subsystem 136 to receive such auxiliary data. The additional functionality of the system 100 also minimizes or avoids the need for modifications to the publication subsystem 124 itself, e.g. to accommodate the storage of data defining dynamic adjustments. Further, the above-mentioned modifications, even if carried out, may require providers 108 to publish proprietary processes (e.g. to the subsystem 124) defining how adjustments are made to offer data. Such publication may not be desirable.

To that end, the intermediation server 120 also includes an auxiliary repository 140 in which offer data (e.g. as received from the offer subsystem 116) is stored. The offer data stored includes both primary offer data, defining the attributes of an offer such as price, item types and names, and the like, and auxiliary offer data defining adjustments that were applied in order to generate the primary offer data. The auxiliary data can therefore define, for example, a discount that was applied to obtain the primary offer data. In other words, the auxiliary data provides a definition or explanation of any differences that exist between the primary offer data and any data in the publication system 124 that may be retrieved by the downstream subsystem 132.

In addition, the intermediation server 120 updates the auxiliary repository 140 to store order identifiers in connection with ordered items (that is, offers that have been ordered by the client subsystem 104). The intermediation server 120 can further transmit the auxiliary data to the provider subsystem 108 (e.g. to the downstream subsystem 132) in response to a request from the provider subsystem 108, or without requests, e.g. on a previously agreed-upon schedule. In other words, although the downstream subsystem 132 may require technical modifications to retrieve the auxiliary data from the intermediation server 120 and process the auxiliary data, the processes by which the downstream subsystem 132 receives the primary offer data and retrieves data from the publication subsystem 124 need not be modified. Similarly, modification of the reporting subsystem 136 may also be avoided.

Before further discussion of the functionality of the various components of the system 100, certain internal components of the intermediation server 120 and the provider subsystem 108 will be described in connection with FIG. 2.

Figure 2:
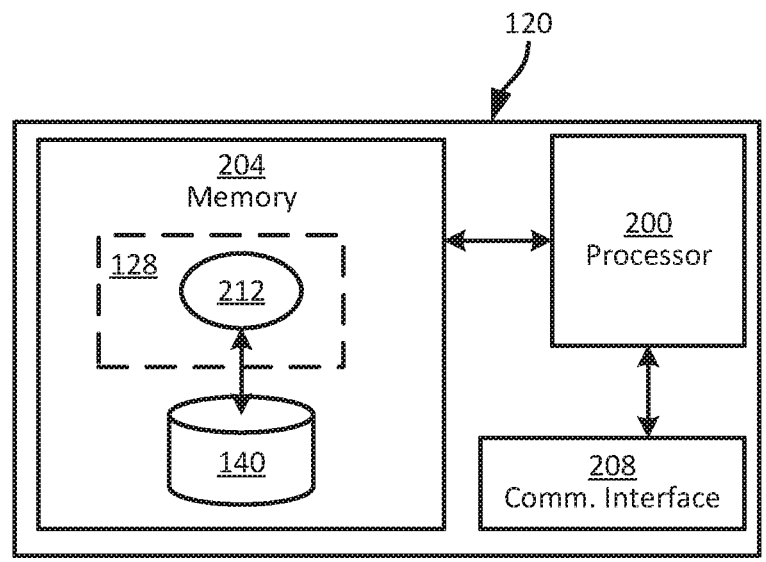
FIG. 2 is a diagram illustrating certain internal components of the client subsystem and the provider subsystem of FIG. 1.
Figure 2:
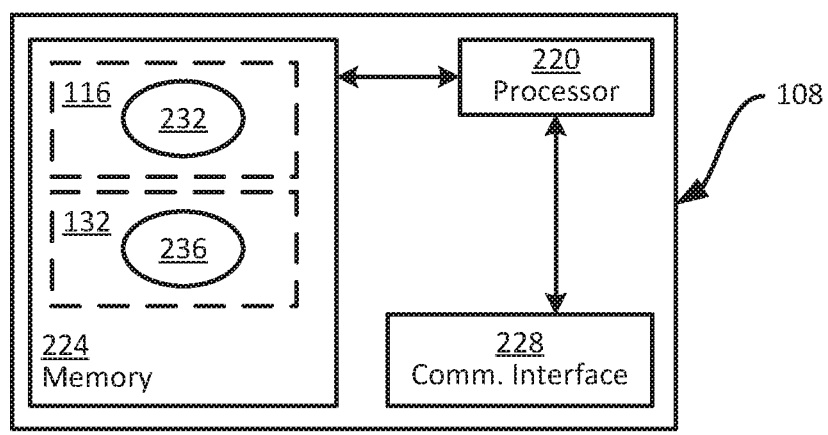

Turning to FIG. 2, the intermediation server 120 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs), The processor 200 is also interconnected with a communication interface 208, which enables the server 120 to communicate with the other computing devices of the system 100 via the network 112. The communication interface 208 therefore includes any necessary components (e.g. network interface controllers (NICs), radio units, and the like) to communicate via the network 112. The specific components of the communication interface 208 are selected based on the nature of the network 112. The server 120 can also include input and output devices connected to the processor 200, such as keyboards, mice, displays, and the like (not shown).

The components of the server 120 mentioned above can be deployed in a single enclosure, or in a distributed format. In some examples, therefore, the server 120 includes a plurality of processors, either sharing the memory 204 and communication interface 208, or each having distinct associated memories and communication interfaces.

The memory 204 stores the auxiliary repository 140 mentioned above, as well as computer-readable instructions executable by the processor 200 to implement various functionality. The computer-readable instructions may also be referred to as applications, and in the illustrated example the memory 204 stores an order handling application 212 (also referred to herein simply as the application 212). As illustrated in FIG. 2, the application 212 can implement the order subsystem 128 shown in FIG. 1. The processor 200 executes the instructions of the application 212 in order to perform various actions defined by the instructions contained therein. In the description below, the processor 200, and more generally the server 120, are said to perform, or to be configured to perform, those actions. It will be understood that they are so configured via the execution (by the processor 200) of the instructions of the applications stored in memory 204. In general, the server 120 is configured, via execution of the application 212, to implement the above-mentioned storage and updating of order data in the repository 140 to enable access to auxiliary order data by the downstream subsystem 132.

The provider subsystem 108, as shown in FIG. 2, also includes a processor 220, a memory 224 and a communications interface 228. The memory 224 stores an offer generation application 232 and a downstream processing application 236 that implement the offer subsystem 116 and the downstream subsystem 132, respectively.

Figure 3:
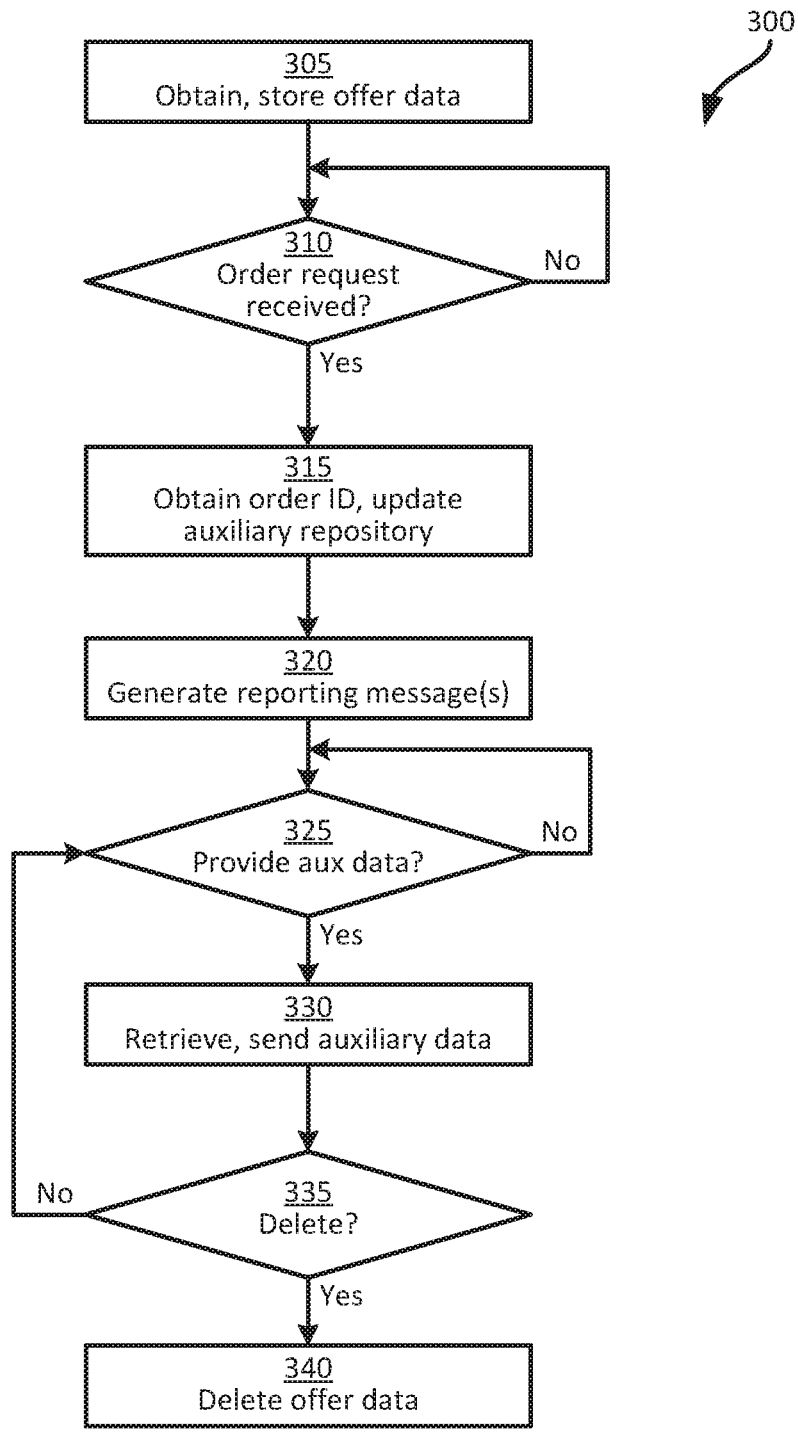
FIG. 3 is a flowchart of a method of providing auxiliary data access.

Turning now to FIG. 3, certain aspects of the operation of the system 100 will be described in greater detail. Specifically, FIG. 3 illustrates a method 300 of enabling access to auxiliary data. The performance of the method 300 will be discussed in conjunction with its performance within the system 100, and specifically by the intermediation server 120 via execution of the application 212.

Figure 4:
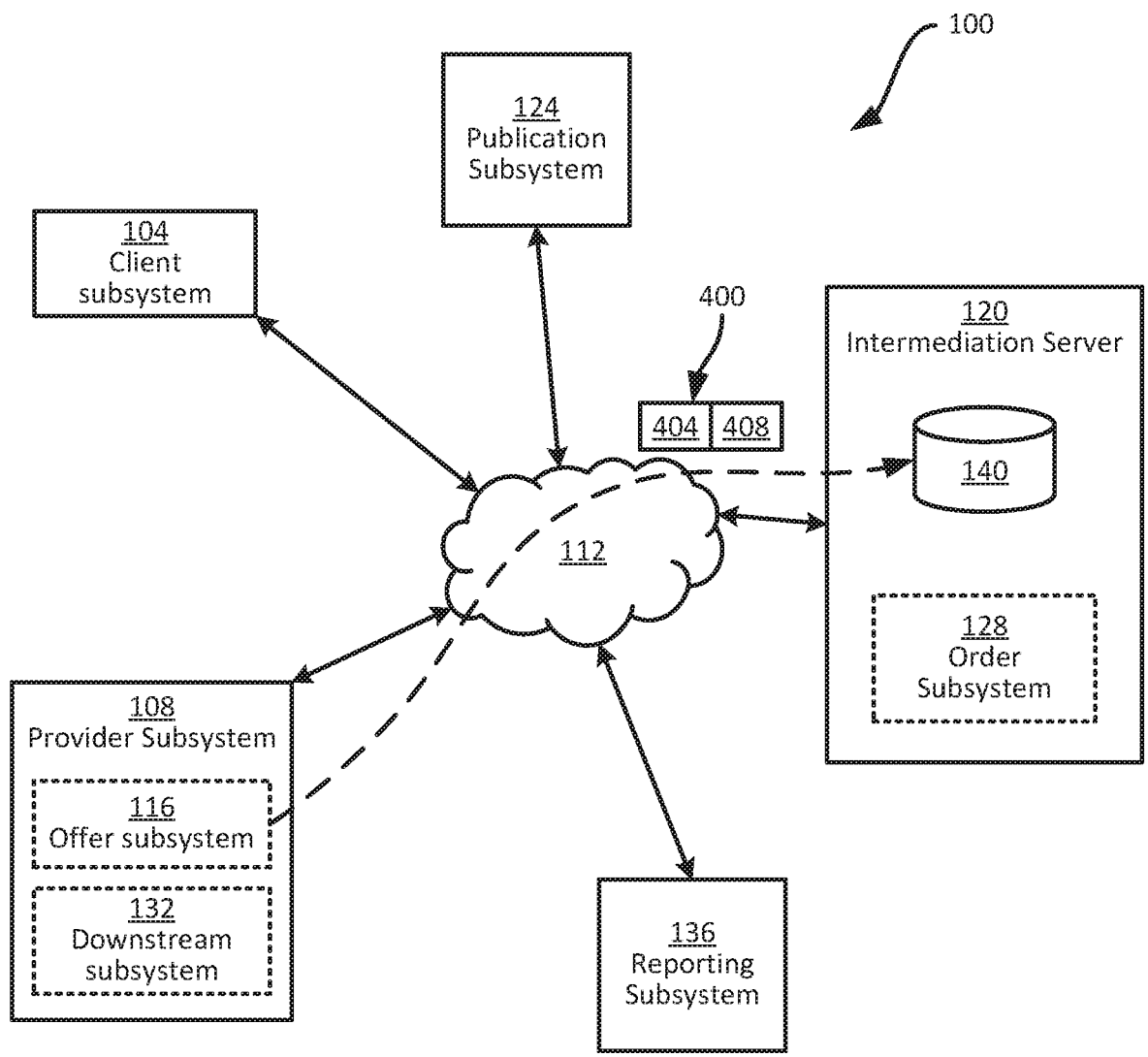
FIG. 4 is a diagram illustrating a performance of block 305 of the method of FIG. 3.

At block 305, the intermediation server 120 obtains and stores, e.g. in the repository 140, offer data in response to a request from the client subsystem 104. For example, as noted earlier, the intermediation server 120 can receive a request from the client subsystem 104, relay the request to one or more providers (e.g. to the provider subsystem 108), and receive offer data from the providers. In the present example, as shown in FIG. 4, offer data 400 is generated by the offer subsystem 116 and sent to the intermediation server 120 for storage in the repository 140. The offer data 400 includes primary data 404 and auxiliary data 408.

The primary data 404 defines characteristics of one or more items (e.g. travel-related products and services) offered by the operator of the provider subsystem 108 for purchase, e.g. by the consumer represented by the client subsystem 104. For example, as shown below in Table 1, the primary data defines a flight from Paris to New York City on Dec. 18, 2019, with a price of $950. Various other characteristics may also be defined in the primary data 404, including ancillary services such as baggage check, lounge access and the like. The primary data 404 may also define an itinerary consisting of more than one flight.

TABLE 1

Repository 140

| Offer ID | Primary | Auxiliary | Order ID |
|---|---|---|---|
| 400 | Origin: Paris<br>Dest: NYC<br>Date: Dec. 18, 2019<br>Price: $950 | Discount: 20% | |
| ... | ... | ... | ... |

As also seen in Table 1 the auxiliary data 408 defines a discount that was applied to an original price of the flight defined in the primary data 404, to arrive at the price shown in the primary data 404. That is, the flight defined by the primary data 404 has an original price of $1187.50, which is not explicitly reflected in the offer data 400. The discount may have been applied at the offer subsystem 116 for any of a wide variety of reasons (e.g. a customer loyalty program). Various other modifications to original prices are also contemplated, including greater or smaller discounts, and markups (i.e. increases, rather than decreases, in price). The auxiliary data 408 can also provide additional data (not shown) that indicates the reason the adjustment was made. For example, the auxiliary data 408 can include a transaction reference, a rule identifier or the like.

Of particular note, if the publication system 124 contains data concerning the flight shown above, the price contained therein may be the unmodified price of $1187.50, because the discount reflected in the auxiliary data 408 was applied dynamically (e.g. based on the identity of the client subsystem 104 or the underlying customer), and was therefore not published to the subsystem 124. The auxiliary data 408 therefore defines an adjustment between the primary data 404 (i.e. the actual offer) and the corresponding published data available at the subsystem 124.

Returning to FIG. 3, at block 310 the intermediation server 120 awaits an order request in connection with the offer 400. As will be apparent to those skilled in the art, the intermediation server 120 may receive any number of offers via multiple performances of block 305. Order requests may be received for only a subset of such offers. When the determination at block 310 is negative as it relates to the offer 400, the server 120 can continue to wait for an order request. In some examples, the offer 400 may be deleted or otherwise marked unavailable in the repository 140 after a configurable time period. When the determination at block 310 is affirmative, indicating that the client subsystem 104 has sent an order request, the server 120 proceeds to block 315.

At block 315, the server 120 obtains an order identifier and updates the auxiliary repository to store the order identifier in connection with the offer data. The order identifier is a distinct identifier from the offer identifier indicated above in Table 1 ("400" in the present example). The order identifier may be, for example, an electronic ticket number, and is generally an identifier employed for other functions within the system 100. The order identifier can be generated by the order subsystem 128, or by the provider subsystem 108 itself. Generation of the order identifier may depend on the completion of various other processing stages not directly relevant to this disclosure, such as effecting payment from the customer for the ordered item(s). Upon receipt of the order identifier, the intermediation server 120 updates the repository 140 with the order identifier, as shown below in Table 2.

TABLE 2

Updated Repository 140

| Offer ID | Primary | Auxiliary | Order ID |
|---|---|---|---|
| 400 | Origin: Paris<br>Dest: NYC<br>Date: Dec. 18, 2019<br>Price: $950 | Discount: 20% | 1234567 |
| . . . | . . . | . . . | . . . |

As seen above, in addition to the primary and auxiliary data 404 and 408 shown earlier, the record in the repository 140 corresponding to the offer 140 has been updated to include the order identifier "1234567". In some examples, updated primary and/or auxiliary data may also be obtained at block 315. That is, in some instances the purchase of offered items includes the generation of a final price and/or a final set of items, during which the order subsystem 128 can further adjust the price and/or composition of the initial offer.

Figure 5:
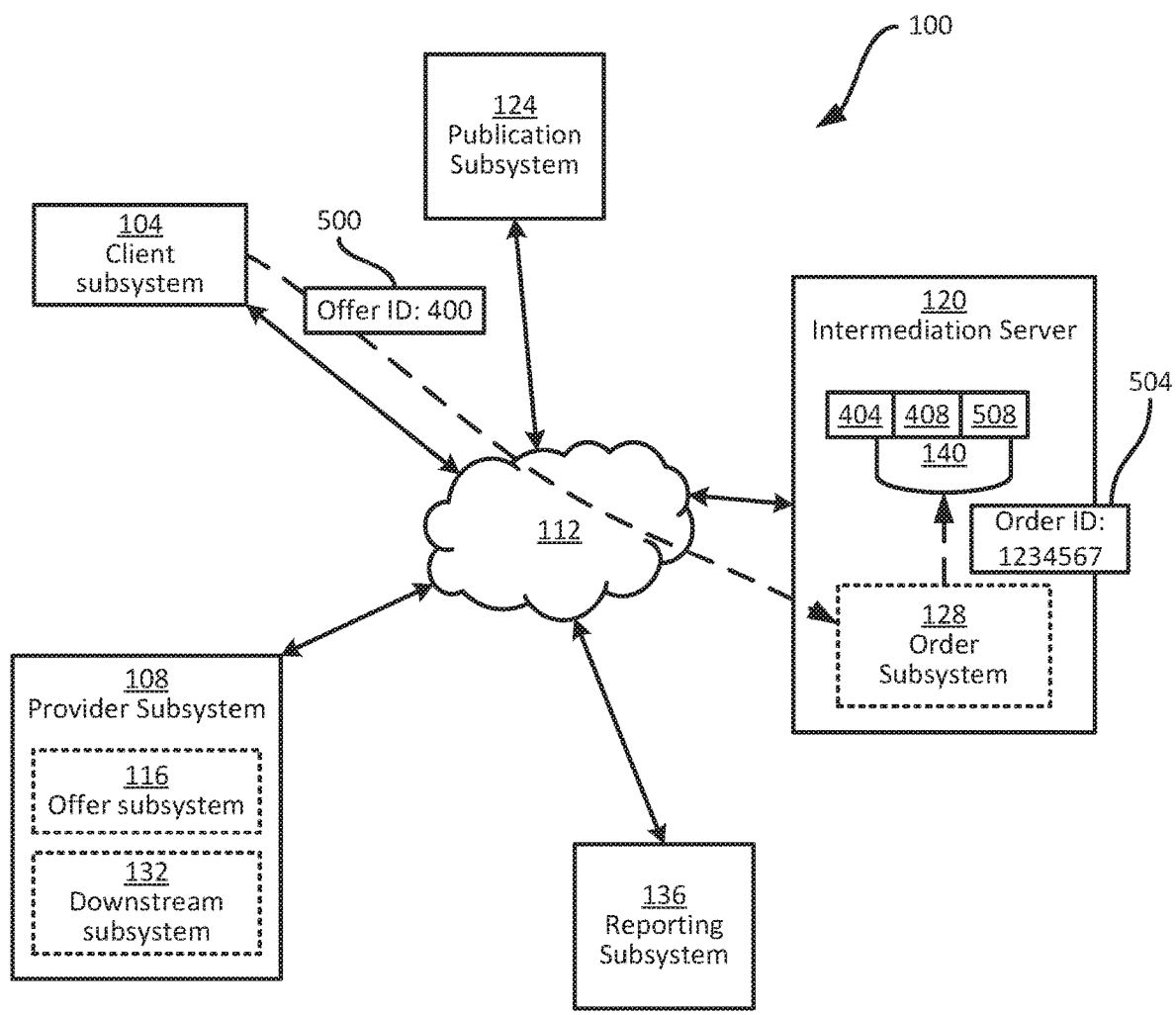
FIG. 5 is a diagram illustrating a performance of blocks 310 and 315 of the method of FIG. 3.

FIG. 5 illustrates example performances of blocks 310 and 315 in the system 100. In particular, an order request 500 is shown being transmitted from the client subsystem 104 to the intermediation server 120 (and specifically to the order subsystem 128). The order request 500 contains the offer identifier "400", and the order subsystem 128 therefore initiates a processing flow to complete the purchase of the flight shown in Tables 1 and 2 by the client subsystem 104. The specific nature of that processing flow is beyond the scope of the present disclosure, however one of the outputs of the order process is the generation of the above-mentioned order identifier. The order identifier is stored in the repository 140, e.g. via a message 504, in association with the record defining the order 400. Thus, that record is updated to also contain an order identifier value 508.

Referring again to FIG. 3, at block 320 the intermediation server 120 (e.g. the order subsystem 128) generates at least one reporting message containing order data for transmission to the downstream subsystem 132 of the provider subsystem 108. The reporting message contains the primary data 404 from the repository 140, but omits the auxiliary data 408. The server 120 then sends the reporting message for delivery to the downstream subsystem 132 via any suitable channel.

Figure 6:
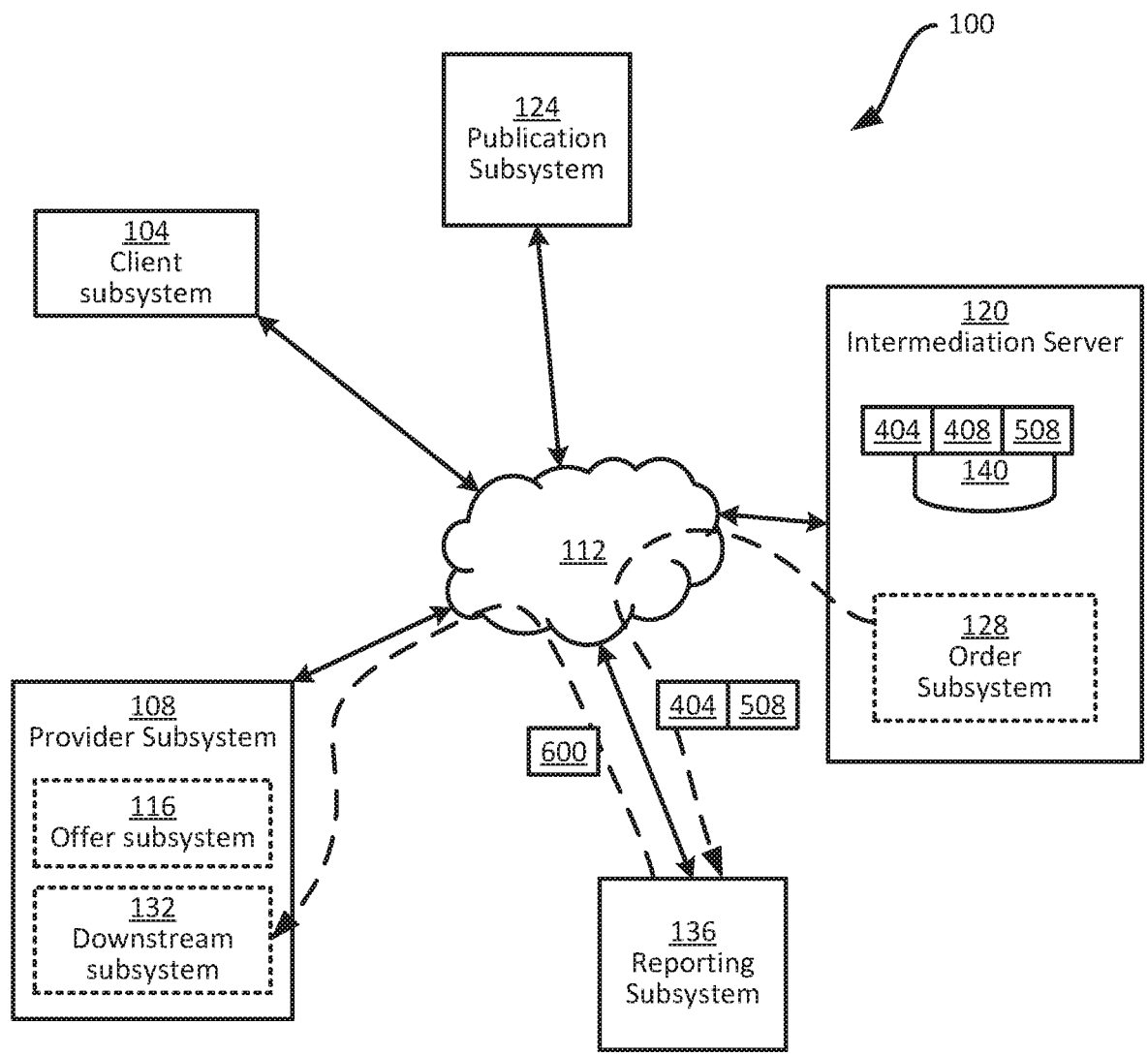
FIG. 6 is a diagram illustrating a performance of block 320 of the method of FIG. 3.

In some examples, the reporting message can be sent directly to the provider subsystem 108 via the network 112 according to any of a variety of suitable formats, including those defined by the Data Interchange Specifications Handbook (DISH) in the context of travel-related items. In other examples, the reporting message is sent to the reporting subsystem 136 rather than directly to the downstream subsystem 132. An example performance of block 320 according to the above-mentioned indirect reporting is shown in FIG. 6. As will be apparent to those skilled in the art, formats such as DISH may not be able to effectively accommodate the auxiliary data. The auxiliary data is therefore omitted from the reporting message, to be transmitted separately as discussed below.

FIG. 6 illustrates the transmission of the primary data 404 and the order identifier 508 from the intermediation server 120 to the reporting subsystem 136. The reporting subsystem 136 may be configured, for example, to process a number of such reporting messages and to pass data therein on to the downstream subsystem 132 periodically. For example, the reporting subsystem 136 is shown in FIG. 6 transmitting a message 600 that contains the primary data 404 and the order identifier 508 (and may contain various other data) to the downstream subsystem 132.

Returning to FIG. 3, following the performance of block 320, at block 325 the intermediation server 120 determines whether to send auxiliary data to the downstream subsystem 132. As shown above, the auxiliary data 408 has not yet been provided to the downstream subsystem 132, for example because the communication channels (e.g. APIs, file formats and the like) used to convey the reporting message(s) at block 320 do not support auxiliary data.

The determination at block 325 can include determining whether a request has been received at the intermediation server 120 from the downstream subsystem 132. In other examples, at block 325 the intermediation server 120 determines whether to transmit the auxiliary data without waiting for a request. The specific nature of the determination at block 325 can also be specific to provider subsystems 108. That is, the intermediation server 120 can be configured to wait for a request from the provider subsystem 108, but can also be configured to automatically transmit auxiliary data to another provider subsystem, without waiting for a request. Such push-style transmission of the auxiliary data can be performed periodically, according to any suitable schedule.

Figure 7:
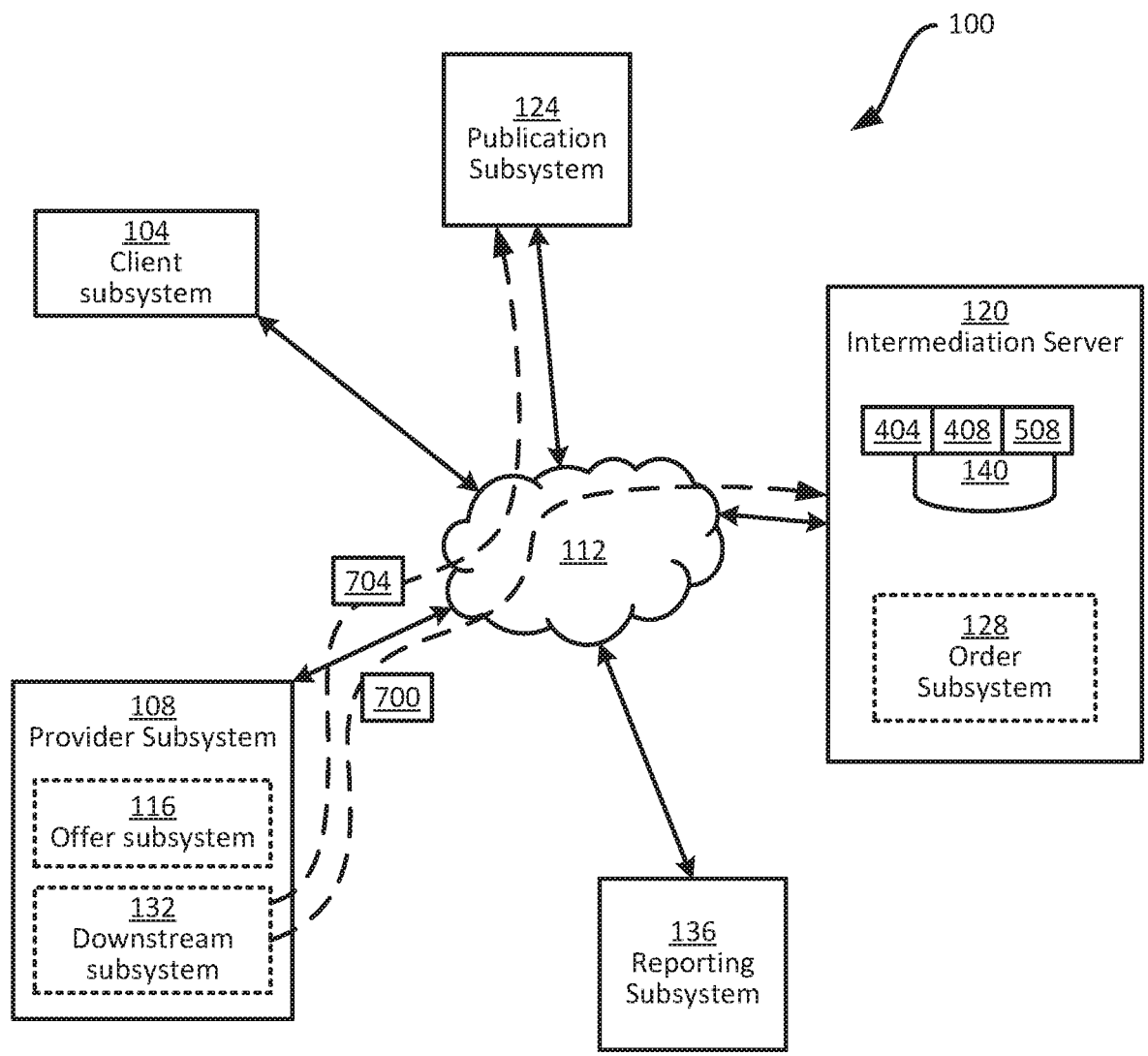
FIG. 7 is a diagram illustrating a performance of block 325 of the method of FIG. 3.

FIG. 7 illustrates an example performance of block 325, in which the downstream subsystem 132 sends a request 700 including the order identifier 508 to the intermediation server 120. The downstream subsystem 132 also sends a request 704 to the publication subsystem 124, e.g. to retrieve previously published data corresponding to the primary data 404. In other examples, the downstream subsystem 132 can omit transmission of the request 704, and rely solely on the primary data received via the reporting message 600 and the auxiliary data from the intermediation server 120. As will be apparent to those skilled in the art, any data retrieved from the publication subsystem 124 will not reflect the adjustments defined in the auxiliary data 408, that resulted in the primary data 404. For example, the data retrieved from the publication subsystem 124 for the Paris-NYC flight shown in Tables 1 and 2 may contain only the original, undiscounted price of $1187.50, and not the price defined in the primary data 404.

When the determination at block 325 is negative, the intermediation server 120 may repeat the performance of block 325. When the determination at block 325 is affirmative, the intermediation server 120 proceeds to block 330. At block 330, the server 120 retrieves at least the auxiliary data 408 from the repository 140 and sends the auxiliary data 408 to the downstream subsystem 132, along with the order identifier 508. The auxiliary data 408 alone may be sent at block 330, or the entire record (i.e. the primary data 404 and the auxiliary data 408) may be transmitted at block 330.

The downstream subsystem 132 is therefore provided with the auxiliary data without any modification to the reporting mechanisms employed to convey the primary data to the downstream subsystem 132, either directly or via the reporting subsystem 136.

At block 335, following transmission of the auxiliary data at block 330, the intermediation server 120 can determine whether to delete the record containing the primary data 404 and auxiliary data 408 in the repository 140. The determination at block 335 can be based on various criteria. In some examples, the determination at block 335 can automatically be affirmative once the auxiliary data has been provided to the downstream subsystem 132. In other examples, the determination at block 335 includes a determination of whether a configurable time period (e.g. five years) has elapsed since creation of the corresponding record in the repository 140. In other examples, a combination of the above criteria may be applied. That is, the intermediation server 120 can determine whether the auxiliary data 408 has been requested and whether the configurable time period has elapsed, with an affirmative determination resulting only when both criteria are satisfied.

When the determination at block 335 is negative, the intermediation server 120 can repeat the determination, or can return to block 325 to await further requests for the auxiliary data. For example, other components of the system 100 may also be enabled to request the auxiliary data 408 from the intermediation server 120, including the client subsystem 104, and other provider subsystems (e.g. for interline flights). The intermediation server 120 can implement access controls for the repository 140, such that only certain entities are permitted access to the offer data 400. For example, the repository 140 can include indications of which entities are permitted to access each record therein.

When the determination at block 335 is affirmative, the record containing the primary data 404, auxiliary data 408 and order identifier 508 is deleted from the repository 140.

Those skilled in the art will appreciate that in some embodiments, the functionality of the applications 212, 232 and 236 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method of providing access to auxiliary data for a provider subsystem, comprising:
   receiving, at an intermediation server, offer data corresponding to an item having published characteristics stored at an external repository distinct from the intermediation server, the offer data including (i) primary data defining modified characteristics of the item, and (ii) auxiliary data defining an adjustment between the modified characteristics as defined in the primary data and the published characteristics;
   storing the offer data in an auxiliary repository at the intermediation server, in association with an offer identifier;
   receiving, at the intermediation server, an order request containing the offer identifier from a client subsystem;
   in response to receiving the order request:
      obtaining, at the intermediation server, an order identifier corresponding to the offer data; and
      updating the auxiliary repository to store the order identifier in association with the offer data;
   in response to obtaining the order identifier, generating a reporting message for transmission from the intermediation server to the provider subsystem, the reporting message containing the primary data and omitting the auxiliary data;
   sending the reporting message via a first channel incompatible with the auxillary data; and
   subsequent to generating and sending the reporting message, sending at least the auxiliary data from the intermediation server to the provider subsystem via a second channel distinct from the first channel.

2. The method of claim 1, wherein sending at least the auxiliary data to the provider subsystem includes:
   receiving, from the provider subsystem, request containing the order identifier; and
   in response to the request, retrieving the offer data from the auxiliary repository, and sending at least the auxiliary data to the provider subsystem.

3. The method of claim 1, wherein sending at least the auxiliary data to the provider subsystem includes automatically retrieving the offer data from the auxiliary repository, and sending at least the auxiliary data to the provider subsystem.

4. The method of claim 1, wherein the primary data defines at least one of composition data and a price for the item, and wherein the auxiliary data defines at least one of (i) a discount or a markup to the price, and (ii) a modification to the composition data.

5. The method of claim 1, wherein sending the reporting message comprises sending the reporting message directly to the provider subsystem.

6. The method of claim 1, wherein sending the reporting message comprises sending the reporting message to a reporting subsystem distinct from the provider subsystem, for delivery to the provider subsystem.

7. The method of claim 2, further comprising:
detecting that an auxiliary record deletion criterion has been met; and
in response to the detection, deleting the offer data from the auxiliary repository.

8. The method of claim 7, wherein the auxiliary record deletion criterion includes a determination that the intermediation server has received the order request containing the order identifier.

9. The method of claim 1, further comprising, prior to storing the offer data: obtaining the offer data via at least one of transmission and reception of a message based on the New Distribution Capability (NDC) standard.

10. An intermediation server, comprising:
a communications interface;
a memory storing an auxiliary repository containing:
offer data corresponding to an item having published characteristics stored at an external repository distinct from the intermediation server, the offer data including (i) primary data defining modified characteristics of the item, and (ii) auxiliary data defining an adjustment between the modified characteristics as defined in the primary data and the published characteristics, and
an offer identifier associated with the offer data; and
a processor connected with the communications interface and the memory, the processor configured to:
receive an order request containing the offer identifier from a client subsystem;
in response to receiving the order request:
obtain an order identifier corresponding to the offer data; and
update the auxiliary repository to store the order identifier in association with the offer data;
in response to obtaining the order identifier, generate a reporting message for transmission to a provider subsystem, the reporting message containing the primary data and omitting the auxiliary data;
control the communications interface to send the reporting message via a first channel incompatible with the auxillary data; and
subsequent to generating and sending the reporting message, control the communications interface to send at least the auxiliary data to the provider subsystem via a second channel distinct from the first channel.

11. The intermediation server of claim 10, wherein the processor is further configured, in order to send at least the auxiliary data to the provider subsystem, to:
receive, from the provider subsystem, a request containing the order identifier; and
in response to the request, retrieve the offer data from the auxiliary repository, and send at least the auxiliary data to the provider subsystem.

12. The intermediation server of claim 10, wherein the processor is further configured, in order to send at least the auxiliary data to the provider subsystem, to automatically retrieve the offer data from the auxiliary repository, and send at least the auxiliary data to the provider subsystem.

13. The intermediation server of claim 10, wherein the primary data defines at least one of composition data and a price for the item, and wherein the auxiliary data defines at least one of (i) a discount or a markup to the price, and (ii) a modification to the composition data.

14. The intermediation server of claim 10, wherein the processor is further configured to send the reporting message directly to the provider subsystem.

15. The intermediation server of claim 10, wherein the processor is further configured to send the reporting message to a reporting subsystem, distinct from the provider subsystem, for delivery to the provider subsystem.

16. The intermediation server of claim 10, wherein the processor is further configured to:
detect that an auxiliary record deletion criterion has been met; and
in response to the detection, delete the offer data from the auxiliary repository.

17. The intermediation server of claim 16, wherein the auxiliary record deletion criterion includes a determination that the intermediation server has received the order request containing the order identifier.

18. The intermediation server of claim 10, wherein the processor is further configured,
prior to storing the offer data, to obtain the offer data via at least one of transmission and reception of a message based on the New Distribution Capability (NDC) standard.

19. A non-transitory computer-readable medium storing computer-readable instructions executable by a processor of an intermediation server to:
store, in a memory of the intermediation server, an auxiliary repository containing:
offer data corresponding to an item having published characteristics stored at an external repository distinct from the intermediation server, the offer data including (i) primary data defining modified characteristics of the item, and (ii) auxiliary data defining an adjustment between the modified characteristics as defined in the primary data and the published characteristics, and
an offer identifier associated with the offer data;
receive an order request containing the offer identifier from a client subsystem;
in response to receiving the order request:
obtain an order identifier corresponding to the offer data; and
update the auxiliary repository to store the order identifier in association with the offer data;
in response to obtaining the order identifier, generate a reporting message for transmission to a provider subsystem, the reporting message containing the primary data and omitting the auxiliary data;
send the reporting message via a first channel incompatible with the auxillary data; and
subsequent to generating and sending the reporting message, send at least the auxiliary data to the provider subsystem via a second channel distinct from the first channel.

* * * * *